(12) United States Patent
Davies et al.

(10) Patent No.: US 8,574,719 B2
(45) Date of Patent: Nov. 5, 2013

(54) ANTI-FOULING COATING COMPOSITIONS CONTAINING A CARBOXYL-FUNCTIONAL ORGANOSILICONE

(75) Inventors: Cait Marie Davies, Newcastle Upon Tyne (GB); David Neil Williams, Newcastle Upon Tyne (GB); Kathryn Joyce Willett, Bristol (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 12/598,372

(22) PCT Filed: Apr. 28, 2008

(86) PCT No.: PCT/EP2008/055129
§ 371 (c)(1),
(2), (4) Date: Apr. 8, 2010

(87) PCT Pub. No.: WO2008/132195
PCT Pub. Date: Nov. 6, 2008

(65) Prior Publication Data
US 2010/0183886 A1   Jul. 22, 2010

Related U.S. Application Data

(60) Provisional application No. 60/930,411, filed on May 15, 2007.

(30) Foreign Application Priority Data

May 1, 2007   (EP) ..................................... 07107293

(51) Int. Cl.
*B32B 9/04*   (2006.01)
*C09D 183/04*   (2006.01)

(52) U.S. Cl.
USPC .......................................... 428/447; 524/268

(58) Field of Classification Search
None
See application file for complete search history.

(56) References Cited

U.S. PATENT DOCUMENTS

| 3,702,778 | A |   | 11/1972 | Mueller |
|---|---|---|---|---|
| 4,104,296 | A | * | 8/1978 | Pike ............................. 556/419 |
| 4,898,614 | A | * | 2/1990 | Halloran et al. ................. 106/3 |
| 5,126,400 | A | * | 6/1992 | Graiver et al. ................. 525/58 |
| 5,218,059 | A |   | 6/1993 | Kishihara et al. |
| 5,283,927 | A | * | 2/1994 | Gibbon et al. ............. 15/250.48 |
| 5,596,061 | A |   | 1/1997 | Berger et al. |
| 5,807,955 | A | * | 9/1998 | Berger et al. ................... 528/26 |
| 5,817,730 | A |   | 10/1998 | Berger et al. |
| 5,958,116 | A |   | 9/1999 | Kishihara et al. |
| 6,228,967 | B1 | * | 5/2001 | Fost et al. ....................... 528/26 |
| 6,277,445 | B1 | * | 8/2001 | Hasegawa et al. ............ 427/387 |
| 6,387,590 | B1 | * | 5/2002 | Mizutani et al. ........... 430/270.1 |
| 6,565,837 | B2 | * | 5/2003 | Fost et al. .................. 424/70.12 |
| 6,730,765 | B1 | * | 5/2004 | Roth ............................... 528/25 |
| 2005/0129962 | A1 |   | 6/2005 | Amidaiji et al. |
| 2006/0269499 | A1 | * | 11/2006 | Gormley et al. ........... 424/70.12 |
| 2008/0004413 | A1 | * | 1/2008 | Schorzman et al. ............ 528/26 |
| 2008/0008757 | A1 | * | 1/2008 | Kessell et al. ................ 424/486 |
| 2008/0138301 | A1 | * | 6/2008 | Gormley et al. ................ 424/59 |

FOREIGN PATENT DOCUMENTS

| EP | 0 874 032 | 10/1998 |
|---|---|---|
| EP | 0 903 389 | 3/1999 |
| FR | 2 537 985 | 6/1984 |
| GB | 1 307 001 | 2/1973 |
| JP | 63-043973 | 2/1988 |
| JP | 2000-034422 | 2/2000 |
| JP | 2005154315 | * 6/2005 |
| WO | WO 99/33927 | 7/1999 |
| WO | WO 02/074870 | 9/2002 |
| WO | WO 2006/018917 | 2/2006 |

OTHER PUBLICATIONS

English-language machine-translation of JP-2005154315, translation generated Dec. 2012, 10 pages.*
International Search Report and Written Opinion, PCT International Patent Application No. PCT/EP2008/055129, dated Jul. 1, 2008.
Search Report, European Patent Application No. 07107293, dated Mar. 4, 2008.
International Preliminary Report on Patentability, PCT International Patent Application No. PCT/EP2008/055129, dated Nov. 3, 2009.

* cited by examiner

*Primary Examiner* — Robert S Loewe

(74) *Attorney, Agent, or Firm* — Kenyon & Kenyon LLP

(57) ABSTRACT

An anti-fouling coating composition comprising (i) a curable polymer and (ii) an organosilicone polymer. This anti-fouling coating composition has a low surface energy, has suitable elastomeric properties, decreases the settlement of fouling organisms and their adhesion strength, and can be used as a clear coat without a misty or milky appearance.

11 Claims, No Drawings

ANTI-FOULING COATING COMPOSITIONS CONTAINING A CARBOXYL-FUNCTIONAL ORGANOSILICONE

REFERENCE TO RELATED APPLICATION(s)

This application is the U.S. National Phase of PCT/EP2008/055129 filed on Apr. 28, 2008 and claims the benefit of U.S. Provisional Application No. 60/930,411 filed on May 15, 2007.

The invention pertains to an anti-fouling coating composition, a substrate coated with said composition, and the use of said coating composition for inhibiting fouling of a substrate in an aquatic environment.

Man-made structures such as boat hulls, buoys, drilling platforms, dry dock equipment, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

The commercially most successful methods of inhibiting fouling have involved the use of anti-fouling coatings containing substances toxic to aquatic life, for example tributyltin chloride or cuprous oxide. Such coatings, however, are being regarded with increasing disfavour because of the damaging effects such toxins may have if released into the aquatic environment. There is accordingly a need for non-fouling coatings which do not release markedly toxic materials.

It has been known for many years, for example as disclosed in GB 1,307,001 and U.S. Pat. No. 3,702,778, that silicone rubber coatings resist fouling by aquatic organisms. It is believed that such coatings present a surface to which the organisms cannot easily adhere, and they can accordingly be called fouling-release rather than anti-fouling coatings. Silicone rubbers and silicone compounds generally have very low toxicity. The disadvantage of this anti-fouling system when applied to boat hulls is that although the accumulation of marine organisms is reduced, relatively high vessel speeds are needed to remove all fouling species. Thus, in some instances, it has been shown that for effective release from a hull that has been treated with such a polymer, it is necessary to sail with a speed of at least 14 knots. For this reason silicone rubbers have gained limited commercial success and there is a need for improvement of the anti-fouling and fouling-release properties of these environmentally benign coatings.

FR 2 537 985 discloses an anti-fouling coating composition comprising a methyl organosiloxane resin, a silicone elastomer, polytetrafluoroethylene, an acrylic binder, and a solvent or diluent.

EP 0 903 389 discloses an anti-fouling composition comprising a photocatalytic oxide, a silicone resin or silica, and a water-repellent fluororesin.

A further improvement was obtained by the provision of an antifouling composition containing a fluid fluorinated alkyl- or alkoxy-containing polymer according to WO 02/074870. However, fluid fluorinated alkyl- or alkoxy-containing polymers or oligomers have the disadvantage that they are not suitable for use in clearcoats, since coatings comprising such fluids are not clear but have a misty or milky appearance.

The present invention provides an anti-fouling coating composition that has a low surface energy, has suitable elastomeric properties, decreases the settlement of fouling organisms and their adhesion strength, and can be used as a clearcoat without a misty or milky appearance.

The present invention relates to an anti-fouling coating composition which comprises (i) a curable polymer and (ii) an organosilicone polymer represented by the general formula:

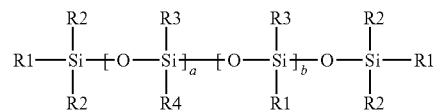

wherein:

R1 may be the same or different and is selected from alkyl, aryl, and alkenyl groups, optionally substituted with an amine group, an oxygen-containing group of the formula $OR^5$, wherein $R^5$ is hydrogen or a $C_{1-6}$ alkyl, and a functional group according to the formula (I):

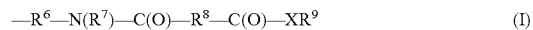

wherein $R^6$ is selected from alkyl, hydroxyalkyl, carboxyalkyl of 1 to 12 carbon atoms, and polyoxyalkylene of up to 10 carbon atoms;

$R^7$ is selected from hydrogen, alkyl, hydroxyalkyl, carboxyalkyl of 1 to 6 carbon atoms, and polyoxyalkylene of 1 to 10 carbon atoms; $R^7$ may be bonded to $R^8$ to form a ring;

$R^8$ is an alkyl group with 1-20 carbon atoms;

$R^9$ is hydrogen or an alkyl group with 1-10 carbon atoms, optionally substituted with oxygen- or nitrogen-containing groups;

X is selected from O, S, and NH;

provided that at least one R1-group in the organosilicone polymer is a functional group according to the above formula (I) or a salt derivative thereof;

R2 may be the same or different and is selected from alkyl, aryl, and alkenyl;

R3 and R4, which may be the same or different, are selected from alkyl, aryl, capped or uncapped polyoxyalkylene, alkaryl, aralkylene, and alkenyl;

a is an integer from 0 to 50,000;

b is an integer from 0 to 100; and a+b is at least 25.

R2, R3, and R4 preferably are independently selected from methyl and phenyl, more preferably methyl.

$R^6$ preferably is an alkyl group with 1-12, more preferably 2-5 carbon atoms.

$R^7$ preferably is hydrogen or an alkyl group with 1-4 carbon atoms.

$R^8$ preferably is an alkyl group with 2-10 carbon atoms.

$R^9$ preferably is hydrogen or an alkyl group with 1-5 carbon atoms.

X preferably is an oxygen atom.

a+b preferably ranges from 100 to 300.

In one embodiment, $R^7$ is hydrogen and $R^8$ is an alkyl group with 1-20, preferably 2-10, more preferably 2-5 carbon atoms. Examples of such functional groups are: 1-butanoic-4-amidopropyl:

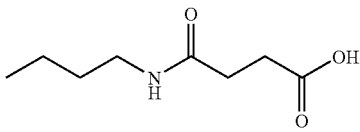

and 1-decanoic-10-amidopropyl:

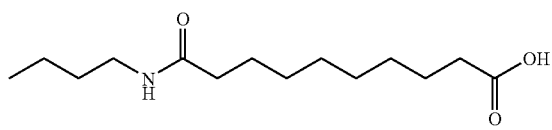 [SMILES: CCCCNC(=O)CCCCCCCCC(=O)O]

In another embodiment, $R^7$ is connected to $R^8$ to form a pyrroline-type ring. Examples of functional groups according to this embodiment are 1-amido-3-carboxypyrrolidone-1-propyl:

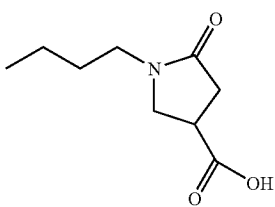

and 1-amido-3-methoxypyrrolidone-1-propyl:

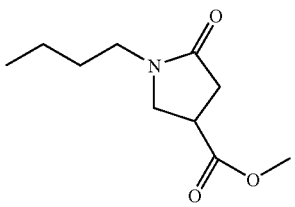

In a preferred embodiment, the organosilicone polymer is present as a fluid in both the coating composition and the coating obtained by curing the coating composition.

Within the framework of the present invention, a fluid material is defined in conformity with ASTM (1996) D4359-90: Standard Test Method for Determining Whether a Material Is a Liquid or a Solid. According to this test, the material is held in a tightly closed container at 38° C. The lid is removed and the container inverted. The flow of the material from the container is observed to determine whether it is a solid or a liquid. A material that flows for a total of 50 mm or less within 3 min is considered a solid. Otherwise it is considered a liquid.

Preferably, the (fluid) organosilicone polymer has a viscosity between 5 and 1,500 cSt at 25° C.

Suitable organosilicone polymers can be prepared in accordance with U.S. Pat. No. 6,565,837.

Preferably, the organosilicone polymer is not reactive towards the curable polymer also present in the coating composition and does not take part in any cross-linking reaction.

Within the present specification, the term "organosilicone polymer" should be understood as comprising organosilicone high polymers and organosilicone oligomers.

In a preferred embodiment, the organosilicone polymer has an average-weight molecular weight in the range from about 500 to 15,000. When the molecular weight is above 15,000, the antifouling properties of the coating will be compromised.

The organosilicone polymer is preferably present in the coating composition of the invention in an amount of at least 1 wt %, more preferably at least 3 wt %, and most preferably at least 5 wt %. The coating composition preferably does not contain more than 40 wt %, more preferably not more than 20 wt %, and most preferably not more than 10 wt % of the organosilicone polymer. All weight percentages are based on the total weight of the coating composition.

The coating composition of the invention further comprises a curable polymer. Preferably, this polymer is an organosiloxane-containing polymer. More preferably, the organosiloxane-containing polymer comprises a repeating unit of the general structure —[SiR'R"—O]—, wherein R' and R" are independently selected from hydrogen, alkyl, aryl, aralkyl, and an alkenyl group. It is particularly preferred that R' and R" are independently selected from methyl and phenyl. It is even more preferred that R' and R" are both methyl. Cyclic polydiorganosiloxanes analogous to those of the formula above may also be employed.

More specific examples of suitable organosiloxane-containing polymers are di-hydroxy-functional polydimethyl siloxanes and siloxane-acrylic hybrid polymers. The most preferred organosiloxane-containing polymer is a polymer containing siloxane groups that are substantially free of carbon (meaning: containing less than 1 wt % of carbon) in the backbone, e.g. polydimethyl siloxane (PDMS).

Other suitable polymers are those disclosed in WO 99/33927, particularly the polymers disclosed on page 12, lines 23-31, viz. organohydrogen polysiloxanes or polydiorganosiloxanes. The polysiloxane may, for example, comprise a copolymer of diorganosiloxane units with organohydrogen siloxane units and/or with other diorganosiloxane units, or a homopolymer of organohydrogen siloxane units or of diorganosiloxane units.

Polysiloxanes that can be cross-linked by a hydrosilylation reaction can also be used as the curable polymer in the coating composition according to the invention. Such polysiloxanes are known as "hydride silicones" and are disclosed, for instance, in EP 874032-A2 on page 3, lines 37-53, viz. polydiorganosiloxanes of the formula $R'''—(SiOR'''_2)_m—SiR'''_3$, wherein each $R'''$ independently is a hydrocarbon or fluorinated hydrocarbon radical, at least two $R'''$ radicals per molecule being hydrogen, and m has an average value in the range of about 10-1,500. The hydride silicone preferably is a hydrogen polydimethyl siloxane. The preferred number average molecular weight range for the hydride silicone is in the range of about 1,000-28,000, corresponding to a value of m in the range of about 13-380.

The curable polymer is preferably present in the coating composition of the invention in an amount of at least 30 wt %, more preferably at least 50 wt %, and most preferably at least 70 wt %. The coating composition preferably does not contain more than 99 wt %, more preferably not more than 90 wt %, and most preferably not more than 80 wt % of the curable polymer.

Preferably, the coating composition according to the invention also comprises one or more fillers, pigments, catalysts, and/or solvents.

Examples of suitable fillers are barium sulphate, calcium sulphate, calcium carbonate, silicas or silicates (such as talc, feldspar, and china clay), aluminium paste/flakes, bentonite or other clays. Some fillers may have a thixotropic effect on the coating composition. The proportion of fillers may be in the range of from 0 to 25% by weight, based on the total weight of the coating composition.

Examples of suitable pigments are black iron oxide and titanium dioxide. The proportion of pigments may be in the range of from 0 to 10% by weight, based on the total weight of the coating composition.

Suitable solvents include aromatic hydrocarbons, alcohols, ketones, esters, and mixtures of the above with one another or an aliphatic hydrocarbon. In order to minimise the use of solvent on environmental grounds, it is advantageous to use as concentrated a solution as possible which is compatible with the coating technique employed. The solids content of the coating composition preferably is at least 50 wt %, more preferably at least 70 wt %. The solids content preferably is not more than 95 wt %, more preferably not more than 90 wt %, and most preferably not more than 80 wt %.

Examples of suitable catalysts are the carboxylic acid salts of various metals, such as tin, zinc, iron, lead, barium, and zirconium. The salts preferably are salts of long-chain carboxylic acids, for example dibutyltin dilaurate, dibutyltin dioctoate, iron stearate, tin (II) octoate, and lead octoate. Further examples of suitable catalysts include organobismuth and organotitanium compounds and organo-phosphates such as bis(2-ethyl-hexyl) hydrogen phosphate. Other possible catalysts include chelates, for example dibutyltin acetoacetonate. Further, the catalyst may comprise a halogenated organic acid which has at least one halogen substituent on a carbon atom which is in the α-position relative to the acid group and/or at least one halogen substituent on a carbon atom which is in the β-position relative to the acid group, or a derivative which is hydrolysable to form such an acid under the conditions of the condensation reaction.

Depending on the type of curable polymer, the coating composition may require a cross-linker. The presence of a cross-linker is only necessary if the curable polymer cannot be cured by condensation. This will depend on the functional groups that are present in said polymer. In general, when the polymer comprises alkoxy groups, the presence of a cross-linker is not necessary. If the polymer comprises alkoxy-silyl groups, the presence of a small amount of a condensation catalyst and water is generally sufficient to achieve full cure of the coating after application. For these compositions, atmospheric moisture is generally sufficient to induce curing, and as a rule it will not be necessary to heat the coating composition after application.

The optionally present cross-linker can be a cross-linking agent comprising a functional silane and/or one or more oxime groups. Examples of such cross-linking agents are presented in WO 99/33927, page 19, line 9, through page 21, line 17. Mixtures of different cross-linkers can also be used.

The anti-fouling coating composition according to the present invention can be applied to a substrate by normal techniques, such as brushing, roller coating, or spraying (airless and conventional). To achieve proper adhesion to the substrate it is preferred to apply the coating composition to a primed substrate. The primer can be any conventional primer/sealer coating system. Good results were found, in particular with respect to adhesion, when using a primer that comprises an acrylic siloxy-functional polymer, a solvent, a thixotropic agent, a filler, and, optionally, a moisture scavenger. Such a primer is disclosed in WO 99/33927. It is also possible to apply the coating composition according to the present invention on a substrate containing an aged anti-fouling coating layer. Before the coating composition according to the present invention is applied to such an aged layer, this old layer is cleaned by high-pressure water washing to remove any fouling. The primer disclosed in WO 99/33927 can be used as a tie coat between the aged coating layer and the coating composition according to the present invention.

After the coating has been cured, it can be immersed immediately and gives immediate anti-fouling and fouling-release protection. As indicated above, the resulting coating has very good anti-fouling and fouling-release properties. This makes the coating composition according to the present invention very suitable for use as an anti-fouling or non-fouling coating for marine applications. The coating composition can be used for both dynamic and static structures, such as boat hulls, buoys, drilling platforms, oil production rigs, and pipes which are immersed in water. The coating composition can be applied on any substrate that is used for these structures, such as metal, concrete, wood or fibre-reinforced resin.

EXAMPLES

Synthesis Example A

Synthesis of
1-methoxypyrrolidone-3-amido-1-propyl
polydimethyl siloxane 1-amido-3-carboxypyrrolidone-1-propyl polydimethyl siloxane fluid was added to 500 ml methanol and 0.28 g p-toluene sulphonic acid. The resulting mixture was heated under reflux at 60° C. for 5 hours. This resulted in the formation of two layers. The supernatant was removed and concentrated under vacuum to leave an orange oil.

Synthesis Example B

Synthesis of 1-butanoic-4-amidopropyl polydimethyl
siloxane

Succinic anhydride (1 g, 0.01 mol) was dissolved in tetrahydrofuran and the mixture added dropwise to 43.7 g (0.01 mol) of an amino-functionalised PDMS over a 20 minute period. The resulting solution was heated to 80° C. under reflux for 2 hours. This resulted in the formation of two layers. The supernatant was removed and concentrated under vacuum to leave an oil.

Synthesis Example C

Synthesis of 1-decanoic-10-amidopropyl
polydimethyl siloxane

Sebacic acid (2 g, 0.01 mol) was dissolved in 60 ml tetrahydrofuran and the mixture added dropwise to 43.7g (0.01 mol) of an amino-functionalised PDMS with stirring. The resulting solution was heated to 80° C. under reflux for 5 hours. This resulted in the formation of two layers. The supernatant was removed and concentrated under vacuum to leave an oil.

Example 1

A three-pack coating composition was prepared with the formulation:

| Pack 1 (Base): | |
|---|---|
| 33 g | α,ω-hydoxy-functional polydimethyl siloxane (dynamic viscosity 35 poise) |
| 3 g | 1-amido-3-dimethylaminopropylamidopyrrolidone-1-propyl polydimethyl siloxane |
| 5 g | xylene |
| Pack 2 (Curing agent): | |
| 1.7 g | tetraethyl orthosilicate |
| 5 g | xylene |
| Pack 3 (Catalyst solution): | |
| 0.28 g | dibutyltin dilaurate |
| 2.54 g | 2,4-pentane dione |

Example 2

A three-pack coating composition was prepared with the formulation:

| Pack 1 (Base): | |
|---|---|
| 65 g | α,ω,-hydoxy-functional polydimethyl siloxane |
| 9 g | xylene |
| Pack 2 (Curing agent): | |
| 3 g | tetraethyl orthosilicate |
| 5 g | 1-amido-3-carboxypyrrolidone-1-propyl polydimethyl siloxane |
| 9.5 g | xylene |
| Pack 3 (Catalyst solution): | |
| 0.5 g | dibutyltin dilaurate |
| 4.8 g | 2,4-pentane dione |

Example 3

A three-pack coating composition was prepared with the formulation:

| Pack 1 (Base): | |
|---|---|
| 33 g | α,ω,-hydoxy-functional polydimethyl siloxane |
| 4.5 g | xylene |
| Pack 2 (Curing agent): | |
| 1.5 g | tetraethyl orthosilicate |
| 2.5 g | 1-methoxypyrrolidone-3-amido-1-propyl polydimethyl siloxane |
| 4.5 g | xylene |
| Pack 3 (Catalyst solution): | |
| 0.25 g | dibutyltin dilaurate |
| 2.4 g | 2,4-pentane dione |

Example 4

A three-pack coating composition was prepared with the formulation:

| Pack 1 (Base): | |
|---|---|
| 33 g | α,ω,-hydoxy-functional polydimethyl siloxane |
| 4.5 g | xylene |
| Pack 2 (Curing agent): | |
| 1.5 g | tetraethyl orthosilicate |
| 2.5 g | 1-butanoic-4-amidopropyl polydimethyl siloxane |
| 4.5 g | Xylene |
| Pack 3 (Catalyst solution): | |
| 0.25 g | dibutyltin dilaurate |
| 2.4 g | 2,4-pentane dione |

Example 5

A two-pack coating composition was prepared with the formulation:

| Pack 1: | |
|---|---|
| 92 g | m-polymer FR355 ® (silicone/acrylic hybrid polymer, ex Wacker) |
| 5 g | 1-methoxypyrrolidone-3-amido-1-propyl polydimethyl siloxane |
| Pack 2 (Curing agent): | |
| 2.8 g | T914 ® catalyst/curing agent (ex-Wacker) |

Example 6

A two-pack coating composition was prepared with the formulation:

| Pack 1: | |
|---|---|
| 50 g | α,ω,-hydoxy-functional polydimethyl siloxane |
| 3 g | 1-amido-3-carboxypyrrolidone-1-propyl polydimethyl siloxane |
| 1.5 g | air floated silica (Aerosil ®) |
| 5 g | titanium dioxide (Tiona 472 ®) |
| 3 g | methyl-tris(methylethylketoxime)silane |
| Pack 2 (Catalyst solution): | |
| 0.04 g | dibutyltin dilaurate |
| 7.5 g | trimethyl benzene |

Example 7

Anti-Fouling Testing

The compositions of Examples 2, 3, and 4 were applied by brush (to a dry film thickness of ~300 μm) to 60 cm×60 cm marine plywood panels, which were primed with two coatings of epoxy primer and an acrylic tie coat. Six samples of each composition were applied by brush. Standard coatings and non-toxic controls were applied as references in order to assess the relative performance and the abundance and diversity of fouling settlement on the coatings according to the invention.

Test panels were immersed from rafts designed for the immersion of experimental test surfaces and the conditions were representative of conditions experienced by hulls of pleasure craft or ships.

The panels were attached to test frames and suspended vertically to between 0.5 and 1.5 m below the water surface at each test sites. The panels were inspected regularly for biofouling presence and coating integrity.

The test sites included: Newton Ferrers, UK, which shows typical fouling from all major fouling classes, and Brattons, Sweden, which has a predominance of shell fouling (hard-bodied animal).

Fouling coverage was assessed in four main ecologically derived fouling categories: Microfouling, Weed, Soft-bodied animal, and Hard-bodied animal, and analysis was carried out visually on these four fouling categories, as this provided sufficient information to differentiate between coating performances whilst allowing some general comparisons to be made between test sites.

The results are shown in the Table below. The data in this Table refers to total fouling coverage of the test panel surfaces, in percentages.

TABLE

|  | Brattons, Sweden 11 weeks | Brattons, Sweden 22 weeks | Newton Ferrers, UK, 16 weeks |
|---|---|---|---|
| Example 2 | 75.83 | 14.20 | 33.33 |
| Example 3 | 46.67 | 23.20 | 32.50 |
| Example 4 | 83.83 | 33.40 | 75.67 |
| Standard antifouling coating | 100.00 | 31.20 | 95.50 |
| Only anti-corrosive primer | 100.00 | 100.00 | 99.67 |

This Table shows that after four months of immersion in UK waters and five months of immersion in Swedish waters, the accumulated fouling was significantly less than that of control substrates coated only with the anticorrosive primer, and less than that of a standard substrate. Any fouling on coatings of Examples 2-4 could be removed very easily by light rubbing, whereas accumulated fouling on the control substrates could not be removed in a similar way.

In addition, it should be mentioned that all coatings according to the present invention were clear and did not have a misty or milky appearance.

The invention claimed is:

1. An anti-fouling coating composition comprising a solution of a solvent, a curable polymer and a fluid organosilicone polymer represented by the general formula:

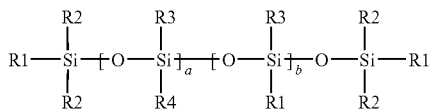

wherein:
R1 may be the same or different and is selected from alkyl, aryl, and alkenyl groups, an oxygen-containing group of the formula $OR^5$, wherein $R^5$ is hydrogen or a $C_{1-6}$ alkyl, and a functional group according to the formula (I):

$$-R^6-N(R^7)-C(O)-R^8-C(O)-XR^9 \quad (I)$$

wherein
$R^6$ is selected from alkyl, hydroxyalkyl, carboxyalkyl of 1 to 12 carbon atoms, and polyoxyalkylene of up to 10 carbon atoms;
$R^7$ is selected from hydrogen, alkyl, hydroxyalkyl, carboxyalkyl of 1 to 6 carbon atoms, and polyoxyalkylene of 1 to 10 carbon atoms; $R^7$ may be bonded to $R^8$ to form a ring;
$R^8$ is an alkylene group with 1-20 carbon atoms;
$R^9$ is hydrogen or an alkyl group with 1-10 carbon atoms, optionally substituted with oxygen- or nitrogen-containing groups;
X is selected from O, S, and NH;
wherein at least one R1-group in the organosilicone polymer is a functional group according to the above formula (I) or a salt derivative thereof;
R2 may be the same or different and is selected from alkyl, aryl, and alkenyl;
R3 and R4, which may be the same or different, are selected from alkyl, aryl, capped or uncapped polyoxyalkylene, alkaryl, aralkylene, and alkenyl;
a is an integer from 0 to 50,000; and
b is an integer from 0 to 100; and
a+b is at least 25,
wherein the solid content of the coating composition is at least 50 wt %.

2. The coating composition according to claim 1 wherein in one embodiment $R^7$ is hydrogen and $R^8$ is an alkylene group with 1-20 carbon atoms.

3. The coating composition according to claim 1 wherein $R^7$ is connected to $R^8$ to form a pyrrolidone-type ring.

4. The coating composition according to claim 1 wherein the organosilicone polymer is fluid.

5. The coating composition according to claim 1 wherein the average-weight molecular weight of the organosilicone polymer is 500-15,000.

6. The coating composition according to claim 1 wherein the curable polymer is an organosiloxane-containing polymer.

7. The coating composition according to claim 1 wherein the curable polymer comprises a repeating unit of the general structure —[SiR'R"—O]—, wherein R' and R" are independently selected from hydrogen, alkyl, aryl, aralkyl, and a vinyl group.

8. The coating composition according to claim 7 wherein R' and R" are independently selected from methyl and phenyl.

9. A coated substrate obtained by applying the coating composition according to claim 1 to the substrate, followed by curing said coating composition, wherein the coated substrate is on a man-made structure.

10. The coating composition according to claim 1 wherein the selected alkyl, aryl, and alkenyl groups of R1 are substituted with an amine group.

11. A method for inhibiting fouling of a substrate in an aquatic environment, the method comprising the step of applying a coating composition comprising a solution of a solvent, a curable polymer and a fluid organosilicone polymer represented by the general formula:

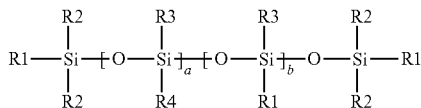

wherein:
R1 may be the same or different and is selected from alkyl, aryl, and alkenyl groups, an oxygen-containing group of the formula $OR^5$, wherein $R^5$ is hydrogen or a $C_{1-6}$ alkyl, and a functional group according to the formula (I):

$$-R^6-N(R^7)-C(O)-R^8-C(O)-XR^9 \quad (I)$$

wherein
$R^6$ is selected from alkyl, hydroxyalkyl, carboxyalkyl of 1 to 12 carbon atoms, and polyoxyalkylene of up to 10 carbon atoms;

$R^7$ is selected from hydrogen, alkyl, hydroxyalkyl, carboxyalkyl of 1 to 6 carbon atoms, and polyoxyalkylene of 1 to 10 carbon atoms; $R^7$ may be bonded to $R^8$ to form a ring;

$R^8$ is an alkylene group with 1-20 carbon atoms;

$R^9$ is hydrogen or an alkyl group with 1-10 carbon atoms, optionally substituted with oxygen- or nitrogen-containing groups;

X is selected from O, S, and NH;

wherein at least one R1-group in the organosilicone polymer is a functional group according to the above formula (I) or a salt derivative thereof;

R2 may be the same or different and is selected from alkyl, aryl, and alkenyl;

R3 and R4, which may be the same or different, are selected from alkyl, aryl, capped or uncapped polyoxyalkylene, alkaryl, aralkylene, and alkenyl;

a is an integer from 0 to 50,000; and b is an integer from 0 to 100; and a+b is at least 25, and wherein the solid content of the coating composition is at least 50 wt %, to the substrate, and immersing the coated substrate in the aquatic environment.

* * * * *

UNITED STATES PATENT AND TRADEMARK OFFICE
CERTIFICATE OF CORRECTION

PATENT NO.         : 8,574,719 B2                                                          Page 1 of 1
APPLICATION NO. : 12/598372
DATED              : November 5, 2013
INVENTOR(S)        : Davies et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 117 days.

Signed and Sealed this
Twenty-second Day of September, 2015

Michelle K. Lee
*Director of the United States Patent and Trademark Office*